Patented Oct. 29, 1935

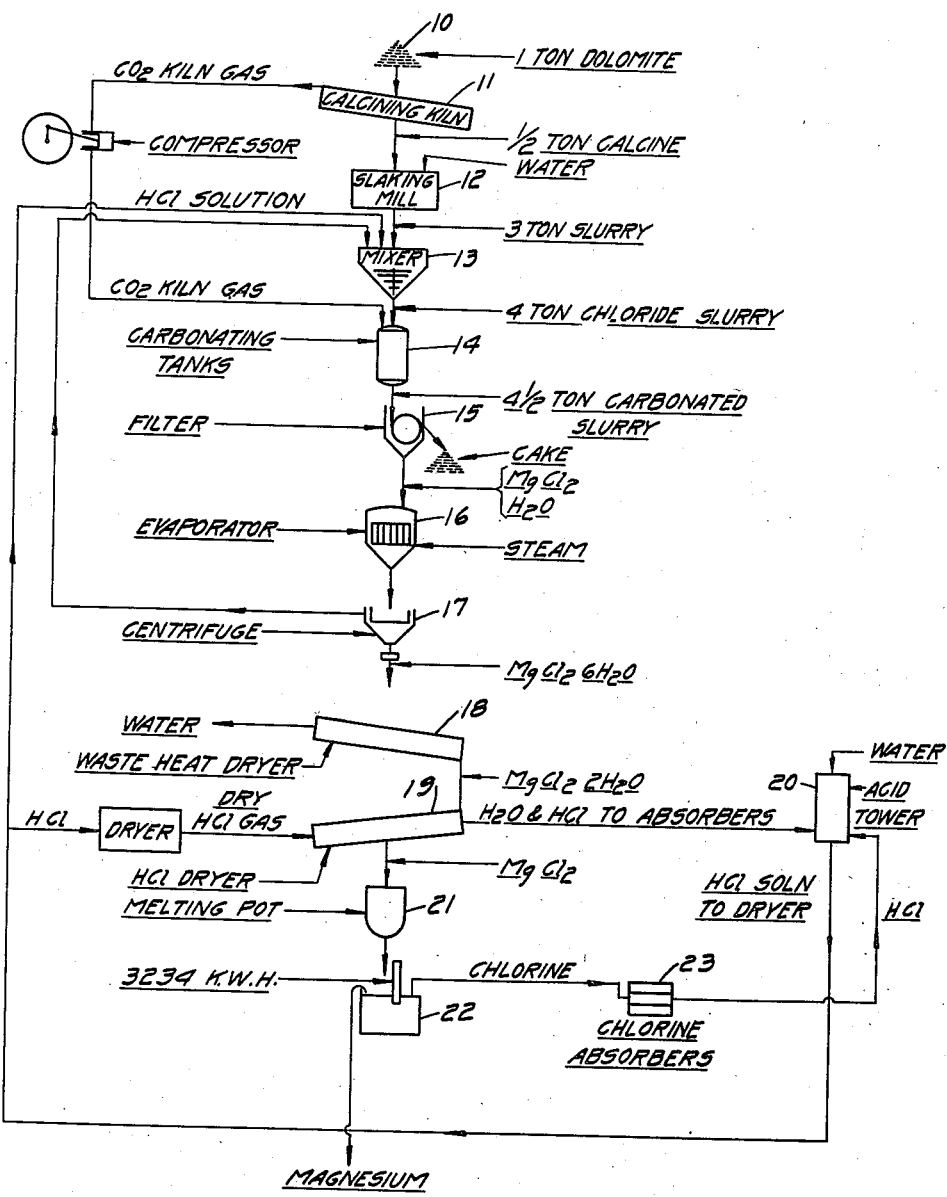

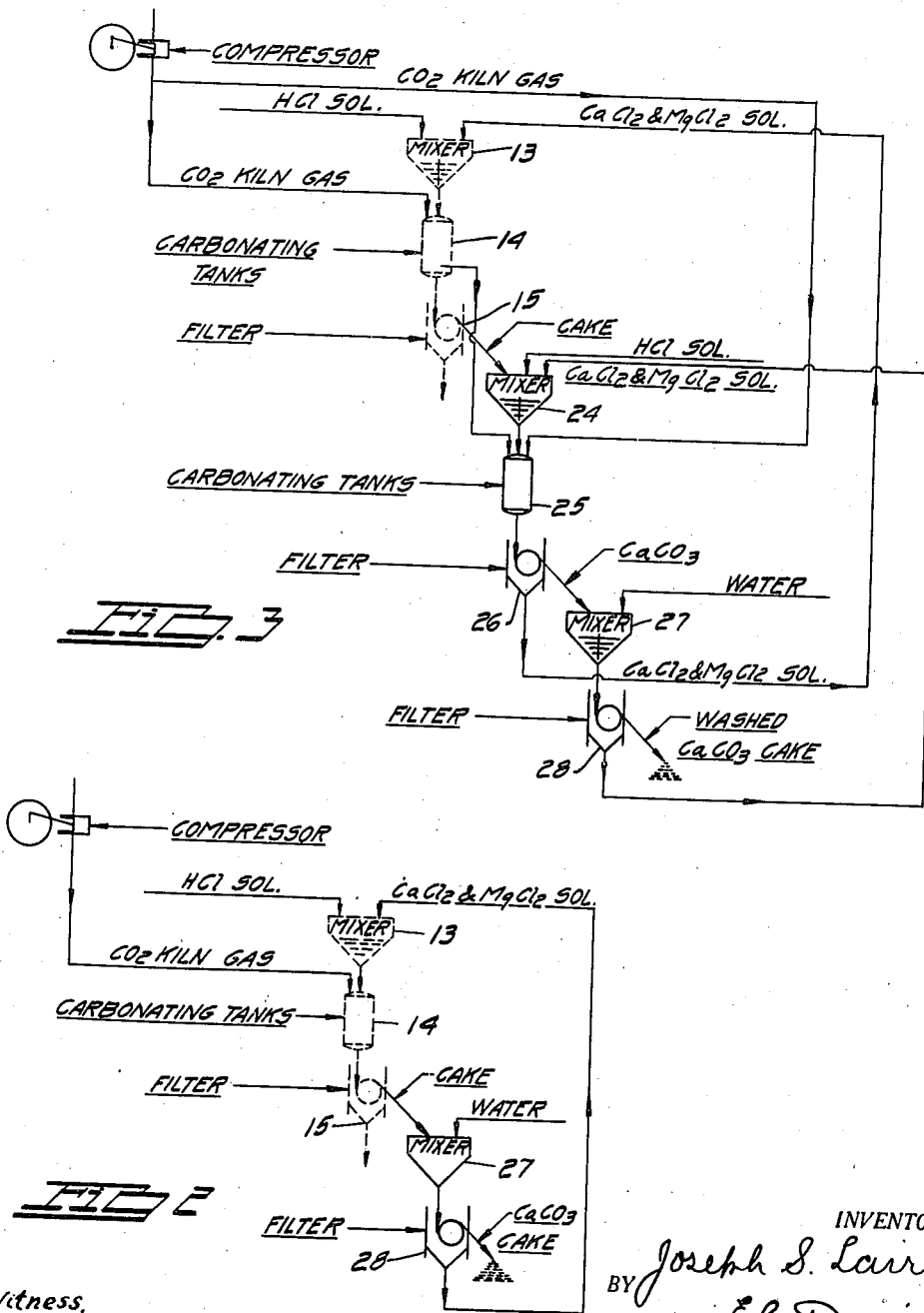

2,019,265

UNITED STATES PATENT OFFICE 2,019,265

PROCESS OF PRODUCING MAGNESIUM CHLORIDE

Joseph S. Laird, Dearborn, Mich., assignor to Ford Motor Company, Dearborn, Mich., a corporation of Delaware Application January 2, 1932, Serial No. 584,338

7 Claims. (Cl. 23—91)

The object of my invention is to provide a new and relatively inexpensive process whereby metallic magnesium may be produced.

In my improved process dolomite, magnesian limestone, or calcareous magnesite is used as a raw material. Because of the immense quantities of dolomite readily accessible, its cheapness to mine, and its wide distribution throughout the world, this raw material is ideal for the production of magnesium. This process may, however, be applied to any material which contains or can be calcined to give free calcium and magnesium oxides.

It may be well to mention herein that the scope of my improved process is limited to the conversion of dolomite or similar substances into magnesium chloride together with the certain improvements in the recovery of the chlorine liberated and its conversion into hydrochloric acid solution whereby it may be reused in the cycle to convert more dolomite to the chloride. The applicant disclaims those features or steps in his process whereby the chloride is dehydrated, melted and then electrolyzed, inasmuch as any one of several available processes for producing metallic magnesium from the chloride may be used in this process with good results. In the course of this specification one such method will be described so as to disclose a workable process whereby the raw material may be converted into the finished product but it is not the intention of the applicant to limit the invention to the use of this last step but rather to disclose a process whereby the raw material may be less expensively converted into a suitable material from which it may subsequently, by either of several well known steps, be converted into metallic magnesium.

Still a further object of my invention is to provide a cyclic process in which no by-products are produced. In all processes, known to the applicant as having the same general purposes, some by-product is obtained due to which a considerable percentage of the magnesium and/or other valuable substance is lost. My improved process may be operated so that practically 100% recovery of the magnesium is obtained, although in actual practice the cost of extracting the last 3% may not be balanced by the value of the material gained.

With these and other objects in view, my invention consists in the several steps comprising my improved process as will be more fully described later in this specification, claimed in my claims, and which are illustrated in the accompanying drawings, in which:

Figure 1 shows a schematic diagram illustrating the essential steps required to convert dolomite by my process into metallic magnesium.

Figure 2 shows a schematic diagram illustrating an obvious way of effectively washing cake whereby a higher extraction of magnesium is obtained, and Figure 3 shows a schematic diagram illustrating an auxiliary process whereby a still higher extraction of magnesium is obtained.

The supplementary steps shown in Figures 2 and 3 are not essential for the successful operation of my method but will ordinarily be desirable as their use will in most cases reduce the cost of the finished product.

In order that the advantages of my improved process may be more fully brought out I believe it necessary to briefly describe other processes by which dolomite may be converted into $MgCl_2$, and to contrast the power required, apparatus used and by-products obtained in these processes with the applicant's process.

In one process chlorine set free by electrolysis of fused magnesium chloride is reacted upon a suitable magnesium base in the presence of water and sulfur dioxide to form magnesium chloride and magnesium sulfate. The magnesium chloride formed is separated from the magnesium sulfate, dried and returned to the electrolyzing bath. The magnesium base may be substantially pure magnesium oxide or hydroxide produced by reacting brine or bittern containing calcium and magnesium chlorides on calcined dolomite, to produce calcium chloride and magnesium hydroxide, the magnesium hydroxide being separated and washed free from the calcium chloride. This process has the disadvantages of requiring a continuous supply of brine or bittern and sulfur dioxide if dolomite or impure magnesite is the source of magnesium; also, considerable of the magnesium is converted to magnesium sulphate which must be disposed of as a by-product.

In an alternative process chlorine liberated by electrolysis of magnesium chloride is converted to hydrochloric acid which is reacted with substantially pure magnesium oxide or hydroxide to form a solution of magnesium chloride. This solution is evaporated to obtain magnesium chloride. The magnesium oxide or hydroxide may be obtained from magnesian limestone or dolomite by calcining and slaking the dolomite to form a slurry, reacting it with brine containing calcium and magnesium chlorides to precipitate magnesium hydroxide and separating and washing the latter free from the calcium chloride remaining in solution. This process has the disadvantages of requiring a continuous supply of brine containing magnesium chloride, and of yielding large quantities of calcium chloride as a by-product of little value.

In another variation of this process the chlorine set free by electrolysis of magnesium chloride is mixed with sulfur dioxide and absorbed in water to form a mixture of hydrochloric and sulfuric acids. This acid liquor is mixed with an aqueous solution of calcium chloride, to eliminate the sulfuric acid as calcium sulfate. The pure hydrochloric acid resulting is reacted upon dolomite forming calcium and magnesium chlorides which are separated, the calcium chloride being returned to react with the sulfuric acid formed in the first step while the magnesium chloride is dried and electrolyzed to obtain magnesium and chlorine. This process has the disadvantage of requiring a continuous supply of sulfur dioxide which is lost by conversion to a by-product of little value, calcium sulfate.

The only other process known to the applicant for extracting magnesium from dolomite is what is termed the carbonating process. In this process the dolomite is calcined to oxide, hydrated, suspended in 40 to 50 volumes of water and carbonated by carbon dioxide under pressure. The magnesium is largely dissolved as magnesium bicarbonate and the calcium precipitated as insoluble calcium carbonate. The calcium carbonate is separated from the magnesium bicarbonate solution, and the latter heated to boiling to precipitate the magnesium as basic magnesium carbonate. This precipitate is separated from the liquor, dried and calcined to magnesium oxide. This magnesium oxide is suspended in water and used to absorb chlorine from an electrolytic cell, to form magnesium chloride, the magnesium chlorate formed simultaneously being separated or converted to magnesium chloride by reaction with potassium chloride, potassium chlorate being a by-product.

As an alternative the chlorine may be converted to hydrochloric acid which can be used to convert the magnesium oxide or magnesium carbonate to magnesium chloride which is crystallized out, dehydrated and electrolyzed in a molten bath to produce magnesium and chlorine.

This last process wastes no valuable material by conversion to useless by-products but has some marked disadvantages as follows:

Due to the limited solubility of magnesium bicarbonate, the carbonation must be carried on in a very large volume—40–60 times as much water as calcined dolomite being required. Large settling tanks or troublesome pressure filters must be used to separate the calcium carbonate formed from the large volume of liquid. This large volume of liquid must be heated to boiling to precipitate the magnesium carbonate, this step involving a large expense for steam. The precipitated magnesium carbonate when filtered out forms a cake containing not less than 80% water. The drying of this cake is troublesome and expensive due both to its high content of water, and its very low heat conductivity. The conversion to the oxide, if this is done, is very troublesome due to the extreme lightness and low heat conductivity of both precipitated magnesium carbonate and magnesium oxide.

In contrast to the process outlined the applicant's process requires no raw material other than dolomite from which magnesium chloride is extracted by a relatively inexpensive process. This process consists in calcining dolomite and hydrating the same with water to form a slurry of calcium and magnesium hydroxides. Hydrochloric acid is added to this slurry in amount substantially corresponding only to the magnesium hydroxide present. The slurry after the addition of the hydrochloric acid is introduced into pressure vessels where it is carbonated by carbon dioxide gas in the products of combustion of the dolomite kiln. By this process the calcium is converted to insoluble calcium carbonate and the magnesium is largely in solution as magnesium chloride. The calcium carbonate is filtered out and the magnesium chloride solution evaporated to form magnesium chloride crystals $MgCl_2 6H_2O$, which is centrifuged, the mother liquor being returned to the process. These crystals are dried, dehydrated, and electrolyzed in a fused bath to produce magnesium and chlorine. The chlorine is recovered, converted to hydrochloric acid and returned to the process to react with more dolomite slurry. It should be pointed out that it is not essential in this process that all or any part of the hydrochloric acid be added before the carbonating is started, it being essential only that the above mentioned amount of acid shall have been added before the conclusion of the carbonating step.

In comparison with the other carbonating process only one-third as much $CO_2$ is required since only the calcium hydroxide is converted to the carbonate, the magnesium remaining in solution as magnesium chloride. The cost of the $CO_2$ gas is not the material factor in this connection but the cost of compressing the gas in order to force it through the slurry is a material cost and one which is greatly reduced in the applicant's process.

As noted above in the bicarbonating process referred to, 40 to 50 volumes of water must be added because of the limited solubility of the magnesium carbonate. This produces a relatively thin slurry so that pressure filter presses must be used or very large settling tanks employed to extract this enormous amount of water. The economical vacuum filter used in the applicant's process will not operate on the low concentration of fluid required by this process. The applicant is able to use a solution containing only one-eighth the amount of water because he is not limited by the solubility of the magnesium compound formed. The amount of water in his solution is determined by the maximum allowable viscosity of the slurry which can be handled in the carbonating tanks. Consequently, only one-eighth the carbonating tank capacity will be required with the applicant's process. Inasmuch as these tanks represent a material portion of the overhead cost in producing magnesium by this process their reduction contributes materially to a cheaper product.

Still a further advantage results to the applicant in that the former process required about 40 pounds of steam for each pound of magnesium produced to boil the solution so as to precipitate the bicarbonate; whereas, the steps involving the separation of the magnesium carbonate from the mother liquor and the drying of the same are entirely avoided in the applicant's process at a very material saving.

The exact steps and equipment used by the applicant will now be disclosed so as to enable others to carry on this process. It will be apparent that the quantities of the products after each step are only approximate, as these products will vary as the composition of the dolomite is changed.

Referring to Figure 1 of the accompanying drawings, it will be seen that I have taken as an example 1 ton of dolomite, as shown by numeral 10, which dolomite consists of 1140 pounds of $CaCO_3$, 840 pounds of $MgCO_3$ and 20 pounds of impurities. This dolomite is run through a calcining kiln 11, which is preferably of the rotary type, wherein the dolomite is converted into about ½ ton of calcined product and 942 pounds of $CO_2$ gas. The calcined product consists of about 638 pounds of CaO, 400 pounds of MgO and approximately 20 pounds of impurities. This calcined mixture is then slaked with 2½ tons of water to produce 3 tons of slurry, this slaking being preferably accomplished in a ball mill 12. I have found that grinding the slurry until practically all particles will pass a 100-mesh sieve is preferable to merely slaking and separating the coarse unslaked particles.

The 3 tons of slurry which now consists of calcium and magnesium hydroxides suspended in water is now mixed in a mixer 13 with hydrochloric acid, the acid being obtained from the conversion of chlorine gas from the electrolytic cell into hydrochloric acid. The hydrochloric acid added, preferably is in an amount somewhat less than that required to react with the magnesium hydroxide present, for this reason; the extraction of magnesium is not quite complete and if exactly as much hydrochloric acid is added as corresponds to the magnesium hydroxide present, the magnesium chloride solution will be contaminated by a small percentage of calcium chloride. By maintaining an appreciable excess of $Mg(OH)_2$ the extraction in this step is incomplete, but the solution contains only a very small amount of calcium chloride. Traces of calcium chloride taken into solution may be removed by conversion to an insoluble compound or separated from the magnesium chloride by crystallizing. If separated as calcium chloride it may be returned to the slurry mixer where it replaces an equivalent amount of hydrochloric acid.

An auxiliary process, shown in Figure 3, which will subsequently be described, is used in connection with this step to extract the remaining amounts of magnesium from the filter cake.

The chloride slurry obtained from the mixer 13 is now conducted into a series of closed carbonating tanks 14 where it is agitated under pressure with the carbon dioxide in the products of combustion of the calcining kiln until the mixture is neutral to phenolphthalein and ceases to absorb carbon dioxide. The magnesium is now largely in solution as magnesium chloride and the calcium has been converted to insoluble calcium carbonate suspended in the solution. The complete reaction may be represented by the equation:

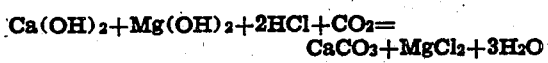

$$Ca(OH)_2 + Mg(OH)_2 + 2HCl + CO_2 = CaCO_3 + MgCl_2 + 3H_2O$$

About 4½ tons of carbonated slurry is obtained from the carbonating tanks, which slurry is pumped into a vacuum filter 15 wherein the insoluble products are removed from the solution, these products comprising ½ ton of calcium carbonate, about 100 pounds of magnesium carbonate, depending upon the completeness of the reaction, and 20 pounds of impurities. The calcium carbonate cake may be washed or treated by the auxiliary process described later as desired before being discharged from the process. The remaining liquid comprises about ½ ton of magnesium chloride and 3½ tons of water. This solution is conducted into an evaporator 16 wherein a little less than 3 tons of the water is removed, leaving the magnesium chloride in a crystallized form as $MgCl_2 6H_2O$. These crystals are run through a centrifuge 17 wherein the mother liquor is extracted and from which the liquor is conducted back to the mixer 13. The return of the mother liquor to the slurry avoids the accumulation of accidentally introduced impurities such as iron etc. as these are thrown out in the calcium carbonate precipitate.

The process so far described incorporates the applicant's principal invention, and the subsequent steps necessary to produce the metallic magnesium from the chloride will be described, as illustrating only one of several known processes for converting the chloride to the metal.

The magnesium chloride crystals are now progressively run through a waste heat drier 18 at about 200–300° F. and then through a hydrochloric acid drier 19 at about 700° F. The dry HCl gas is heated and conducted into one end of the rotary kiln 19 while the $MgCl_2$ is introduced at the other end. Dry hydrochloric acid gas is used in the kiln 19 because at its operating temperature of 700° F. hydrolysis would otherwise occur. As is well known the HCl gas prevents hydrolysis of hydrated magnesium chloride.

In order that the HCl gas may be returned to the system, the gas outlet from the kiln 19 extends to an acid tower 20 where the HCl gas is absorbed by water or dilute hydrochloric acid. A return line from the tower 20 conducts the HCl solution back to the mixer 13 to be used over again.

The anhydrous magnesium chloride from the drier 19 is now conducted to a melting pot 21 from which the melted chloride is then conducted to an electrolyzing furnace 22 where it is converted into metallic magnesium. From ½ ton of magnesium chloride about 220 pounds of metallic magnesium is obtained and about 700 pounds of chlorine is liberated. I make no claim to the type of furnace used as any one of numerous types of electrolyzers may be used. However, the specific means and method employed in the recovery of the chlorine from the electrolyzer is believed to be new and of patentable nature. To accomplish this end the chlorine is first conducted to absorbers 23 wherein it is passed through layers of activated carbon and there absorbed and then subsequently removed from the carbon by the action of steam. I prefer to use two or more absorbing units connected so that while one unit is in connection with the electrolyzer the other unit may be steamed off to thereby produce a continuous process. A condenser forms part of the absorbers 23 and the steam therefrom is conducted through the condenser where hydrochloric acid is recovered. The HCl is then conducted to the acid tower 20 where it is added to the HCl solution from the kiln 19. The specific apparatus in the absorber is not claimed but its application herein is believed new.

As will be seen, from the diagram in Figure 1, the dry HCl gas for operating the kiln 19 is obtained from the HCl solution product of the acid tower. Other means for providing dry HCl gas may be used if desired, for instance combustion of chlorine in hydrogen or interaction of salt and sulfuric acid.

I have found that sufficiently dry HCl may be conveniently prepared by the rectification of aqueous hydrochloric acid. Concentrated hydrochloric acid of 30–35% strength is run continuously into the column of an acid-proof still provided with a reflux condenser. This still may be heated by a steam jacket or other convenient means. Dry HCl gas is taken off from the top of the condenser, and dilute aqueous hydrochloric acid continuously run off from the bottom of the still. This dilute acid may be used for conversion of the dolomite slurry; or may be used to absorb HCl gas coming from the magnesium chloride dryer, whereby concentrated acid is again produced.

From the foregoing it will be seen that my invention consists primarily in the direct production of magnesium chloride from dolomite and hydrochloric acid. Still further, my cyclic process for producing magnesium is believed to comprise a patentable process in which the essential steps may be said to consist of adding hydrochloric acid to the magnesium and calcium oxides or hydroxides in an amount approximately that required for complete reaction with the magnesium and carbonating same, thus producing a negligible quantity of calcium in solution; separating the calcium carbonate and traces of calcium chloride, dehydrating the solution and then electrolyzing the magnesium chloride to produce metallic magnesium and chlorine; and then absorbing the chlorine liberated and converting it to hydrochloric acid at ordinary steam temperature and returning the acid to the first step of the process. It will be noted that there are no by-products produced by this process which remove valuable material from the process and that the only material introduced is dolomite together with the inconsiderable amounts of chlorine or hydrochloric acid required to make up slight unavoidable losses due to incompleteness of absorption, washing of cake, etc.

Auxiliary process: When the amount of HCl is restricted to produce a $MgCl_2$ free from calcium then a considerable quantity of $MgCO_3$ is present in the $CaCO_3$ cake, this amount sometimes being as high as 10%. I have shown in Figure 3, by a schematic diagram, a process whereby a large proportion of the $MgCO_3$ is recovered from the $CaCO_3$ and returned to the first step of the process. Referring to this figure, I have shown the mixer 13, carbonating tanks 14, and filter 15 in dotted lines as they represent the identical apparatus shown in Figure 1. The cake or filtrate from the filter 15 is discharged into a second mixer 24 where wash water is added and an amount of HCl, 2 to 3 times that required to react with the magnesium remaining whereby substantially complete reaction with the magnesium is obtained. Of course, a considerable amount of calcium is also placed in solution by this excess acid, but as will be seen, this calcium does not affect the final product. The product from the mixer 24 is now conducted to a second group of carbonating tanks 25 and carbonated until the percentage of calcium chloride in solution stops decreasing. The second carbonated slurry is now filtered in a filter 26 and the dilute solution of magnesium chlorides containing some calcium chloride is returned to the first stage mixer 13. The calcium carbonate cake from the filter 26 is now almost free from magnesium carbonate and is conducted to a mixer 27 where it is washed with water and filtered in a filter 28, the filtrate solution therefrom being returned to the mixer 24. The filter cake from the filter 28 is now practically free from magnesium and may be used wherever a finely divided calcium carbonate is suitable, as in the manufacture of Portland cement, whiting, agricultural lime, etc.

It may be noted that the purpose and reactions of the carbonation step are not the same in this auxiliary process as in the main process. In the main process carbon dioxide converts the calcium hydroxide or other soluble calcium compounds into insoluble calcium carbonate. In the auxiliary process the calcium is already present as calcium carbonate. Due to the greater amount of calcium carbonate present in the filter cake as compared with magnesium carbonate, more calcium than magnesium chloride is formed on treatment with hydrochloric acid, and some magnesium carbonate remains undissolved. This $MgCO_3$ will react only very slowly with the calcium chloride according to the reaction—

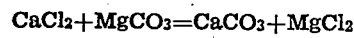

$$CaCl_2 + MgCO_3 = CaCO_3 + MgCl_2$$

Passing carbon dioxide through the slurry assists this conversion by mechanical agitation and probably also by conversion of the magnesium carbonate to soluble magnesium bicarbonate which then reacts with the calcium chloride according to the reactions—

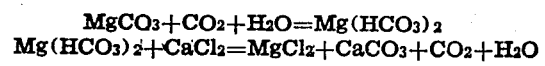

$$MgCO_3 + CO_2 + H_2O = Mg(HCO_3)_2$$
$$Mg(HCO_3)_2 + CaCl_2 = MgCl_2 + CaCO_3 + CO_2 + H_2O$$

The features which I desire to cover by my claims consist in:

The direct production of magnesium chloride by carbonating a slurry made by mixing calcium and magnesium oxides or hydroxides with hydrochloric acid the hydrochloric acid being in amount substantially that required to react with the magnesium present, and then separating the calcium carbonate precipitated from the magnesium chloride remaining in solution.

The variation in the above mentioned process characterized by the hydrochloric acid in the mixture being less than required to react with the magnesium whereby the unreacted magnesium remains in the calcium carbonate precipitate, then treating the latter after separation with sufficient hydrochloric acid to convert substantially all the magnesium to magnesium chloride, then carbonating, then separating the spent calcium carbonate from the dilute solution containing magnesium chloride and then returning said dilute solution to the first step in the process.

The production of metallic magnesium by the electrolysis in a fused bath of the magnesium chloride produced by either of the above processes.

The cyclic process of producing metallic magnesium whereby magnesium chloride produced by either of the above processes is electrolyzed in a fused bath to produce metallic magnesium and chlorine, the chlorine being recovered and converted to hydrochloric acid which is used in the production of more magnesium chloride, by the above process.

Some changes may be made in my improved process without departing from the spirit of my invention and it is my intention to cover by my claims such changes as may reasonably be included within the scope thereof.

I claim as my invention:

1. A process for producing magnesium chloride from dolomite containing magnesium carbonate and calcium carbonate in proportions deviating substantially from equimolecular proportions comprising calcining dolomite and hydrating same with water to form a slurry of calcium and magnesium hydroxides, then adding hydrochloric acid to said slurry in amount not materially exceeding that corresponding to the magnesium hydroxide present, then carbonating the resulting slurry of calcium and magnesium hydroxides and chlorides so as to thereby precipitate calcium carbonate, and then separating said precipitate leaving magnesium chloride in solution.

2. A process for producing magnesium chloride in two stages comprising, first carbonating a slurry of calcium and magnesium hydroxides and chlorides to thereby form soluble magnesium chloride and insoluble calcium carbonate and undissolved magnesium carbonate, and then separating said calcium carbonate and undissolved magnesium carbonate and adding sufficient hydrochloric acid thereto to completely react with the magnesium carbonate and carbonating same thereby forming a mixture of insoluble calcium carbonate and soluble magnesium and calcium chlorides which are returned to the first mentioned slurry, whereby substantially all of the magnesium is recovered with the inclusion of only a negligible amount of calcium.

3. The steps comprising claim 2 wherein the total amount of hydrochloric acid used in both steps is substantially the amount required to react with the total magnesium content.

4. A process for producing magnesium chloride comprising carbonating a slurry of calcium and magnesium hydroxides and chlorides, said carbonating operation being carried on in two successive operations with the chloride content during the first carbonation being less than that which corresponds to all the magnesium present whereby some magnesium carbonate remains in the calcium carbonate precipitate, said precipitate being then supplied with sufficient hydrochloric acid to convert substantially all of the remaining magnesium to magnesium chloride during the second carbonation, the soluble calcium and magnesium chlorides obtained from this second carbonation being returned to the first step of the process, whereby a solution of substantially pure magnesium chloride will be obtained from the first step.

5. A process for producing magnesium chloride comprising calcining dolomite and hydrating same to form a slurry of calcium and magnesium hydroxides, then adding hydrochloric acid to said slurry and carbonating same to thereby precipitate calcium carbonate, the hydrochloric acid being in amount less than that required to react with all the magnesium present, whereby said calcium carbonate precipitate contains some magnesium carbonate, then filtering out said precipitate and treating same with hydrochloric acid in amount more than required to convert all of the magnesium therein to magnesium chloride said mixture being carbonated to assist in converting the magnesium to magnesium chloride, and then returning said solution to the first step in the process.

6. A process for producing magnesium chloride comprising, carbonating a slurry of calcium and magnesium hydroxides and chlorides, the chlorides being in amount less than equivalent to all the magnesium present whereby calcium carbonate and some magnesium carbonate are precipitated, then filtering out said precipitate and treating same with hydrochloric acid in amount more than equivalent to the remaining magnesium therein, said mixture being carbonated to assist in converting the magnesium to magnesium chloride, and then returning the solution from the last mentioned carbonation to the first step in the process.

7. A process for producing magnesium chloride from dolomite containing magnesium carbonate and calcium carbonate in proportions deviating substantially from equimolecular proportions comprising, treating a slurry of calcium and magnesium hydroxides with hydrochloric acid in amount not materially exceeding that which corresponds to the magnesium hydroxide present, carbonating the resulting slurry of calcium and magnesium hydroxides and chlorides to precipitate calcium carbonate and separating such precipitate from the solution containing magnesium chloride.

JOSEPH S. LAIRD.